(12) United States Patent
Bass

(10) Patent No.: US 6,272,873 B1
(45) Date of Patent: Aug. 14, 2001

(54) SELF POWERED MOTOR VEHICLE AIR CONDITIONER

(75) Inventor: John C. Bass, La Jolla, CA (US)

(73) Assignee: Hi-2 Technology, Inc., San Diego, CA (US)

(*) Notice: Subject to any disclaimer, the term of this patent is extended or adjusted under 35 U.S.C. 154(b) by 0 days.

(21) Appl. No.: 09/548,873

(22) Filed: Apr. 13, 2000

(51) Int. Cl.[7] .................................................. F25B 27/00
(52) U.S. Cl. .............................. 62/238.3; 62/244; 62/3.61
(58) Field of Search ................................. 62/238.3, 271, 62/94, 239, 244, 3.2, 3.61

(56) References Cited

U.S. PATENT DOCUMENTS

| | | | | |
|---|---|---|---|---|
| 4,307,575 | * | 12/1981 | Popinski | 62/238.3 X |
| 4,523,631 | * | 6/1985 | McKinney | 62/238.3 X |
| 5,528,905 | * | 6/1996 | Scarlatti | 62/271 X |
| 5,625,245 | * | 4/1997 | Bass . | |
| 5,896,747 | * | 4/1999 | Antohi | 62/476 X |
| 5,901,572 | * | 5/1999 | Peiffer et al. | 62/244 X |

\* cited by examiner

*Primary Examiner*—Michael Powell Buiz
*Assistant Examiner*—Chen-Wen Jiang

(74) *Attorney, Agent, or Firm*—John R. Ross; John R. Ross, III

(57) ABSTRACT

A motor vehicle with a self-powered air conditioner system. An absorption type air conditioning unit is configured to air condition at least a portion of cab space of the motor vehicle. The unit has at least one electric powered component. There is a generator located outside the cab space for vaporizing a refrigerant. There is a condenser for condensing the refrigerant to produce a condensate, and an evaporator configured to remove heat from the cab space by a process of evaporation of the condensate. There is a combustion unit configured to burn fuel from the fuel tank. The combustion unit provides heat to a hot surface. A plurality of thermoelectric modules is mounted in thermal contact with the hot surface. A heat sink is cooled by the cooling water system. The heat sink is positioned so that it is in thermal contact with said plurality of thermoelectric modules. A temperature difference is produce across the modules to permit them to generate electrical power, and an electric control circuit is configured to utilize electric power generated by the modules to power the at least one electric powered component. In a preferred embodiment, excess electric power is used to keep batteries of the motor vehicle charged up. In a preferred embodiment provision is made for hot water to be circulated from the combustion unit to the cab space to provide heat for the cab space when desired.

6 Claims, 4 Drawing Sheets

SELF POWERED MOTOR VEHICLE AIR CONDITIONER

The present invention relates to air conditioners and in particular to air conditioners for motor vehicles.

BACKGROUND OF THE INVENTION

Air conditioners are standard equipment of most motor vehicles currently sold. These air conditioners are typically compression systems. These systems employ four elements: a compressor, a condenser, an expansion valve and an evaporator. Heat is absorbed from the cabin space of the motor vehicle when a refrigerant is evaporated in the evaporator. The engine of the motor vehicle typically provides the power to compress the refrigerant vapor prior to it being re-condensed to a fluid in the condenser. The expansion valve is used to reduce the pressure and temperature of the fluid to conditions in the evaporator.

Absorption type air condensers are well known and widely used. In one such widely used system, a strong solution of ammonia, NH3, in water is heated by a gas flame in a container called a generator and NH3 is driven off as a vapor leaving a weak ammonia solution. The NH3 vapor passes into a condenser where it condenses then it flows to an evaporator where it picks up heat from the space being cooled. The NH3 vapor then (instead of being compressed) is reabsorbed into the weak ammonia solution (which in the meantime has been partially cooled) to reform the strong ammonia solution which is returned to the generator to repeat the process. In a Platen-Munters system hydrogen is added to the refrigerant to improve the performance to the system. In these systems pumps are not required to circulate the refrigerant; however, fans or pumps are needed to remove heat in the condenser and in many cases to circulate air in the space being cooled. Absorption type air conditioners are typically not used for motor vehicle air conditioning. However, U.S. Pat. No. 4,307,575 describes an electric vehicle in which the waste heat from the vehicle's electric motor is used to power an absorption type air conditioning unit.

Thermoelectric devices are well known. These devices utilize physics principals known as the Seebeck effect and the Peltier effect. The Seebeck effects refers to a principal underwhich electricity can be generated from a temperature difference and the Peltier effects refers to the opposite effect in which electricity is used to create a temperature difference. U.S. Pat. No. 5,901,527 describes a system in which the Peltier effect is used to cool the sleeping area of a truck. The truck battery is charged up during normal operation of the truck and the battery runs the cooler when the truck is not operating and the driver is sleeping. Another application of thermoelectric devices on motor vehicles is disclosed in U.S. Pat. No. 5,625,245. In this case electricity is generated with thermoelectric modules mounted in a special assembly for converting heat in a trucks exhaust into electric power to charge the trucks battery. Techniques for fabricating thermoelectric modules for electric power generation are described in U.S. Pat. No. 5,875,098. Thermoelectric modules are commercially available from suppliers such as HiZ Corporation with offices in San Diego, Calif. Model HZ14 has dimensions of about 2.5 inches×2.5 inches and is about 0.2 inch thick. It produces electric energy most efficiently at about 1.65 volts providing about 14 Watts when provided a temperature difference of about 360 F.

In U.S. Pat. No. 5,449,288 an aspirated wick atomizer nozzle is disclosed for providing high quality combustion of fuels such as diesel fuel for providing a heat source for applications such as thermoelectric power generation. All of the patents referred to in this Background Section are incorporated herein by reference.

Many trucks are provided with sleeper compartments in the cab of the truck. After driving many miles truck drivers can park the truck and sleep before proceeding. In a typical prior art truck air conditioning and heating of the cab including the sleeper section is available only if the engine of the truck is running. If the weather is cold or hot the driver may need to keep the engine running while sleeping. This creates a waste of energy, air pollution, noise, and wear on the engine.

What is needed is a better way to heat and cool a motor vehicle cab when the engine of the vehicle is not operating.

SUMMARY OF THE INVENTION

The present invention provides a motor vehicle with a self-powered air conditioner system. An absorption type air conditioning unit is configured to air condition at least a portion of cab space of the motor vehicle. The unit has at least one electric powered component. There is a generator located outside the cab space for vaporizing a refrigerant. There is a condenser for condensing the refrigerant to produce a condensate, and an evaporator configured to remove heat from the cab space by a process of evaporation of the condensate. There is a combustion unit configured to burn fuel from the fuel tank. The combustion unit provides heat to a hot surface. A plurality of thermoelectric modules is mounted in thermal contact with the hot surface. A heat sink is cooled by the cooling water system. The heat sink is positioned so that it is in thermal contact with said plurality of thermoelectric modules. A temperature difference is produce across the modules to permit them to generate electrical power, and an electric control circuit is configured to utilize electric power generated by the modules to power the at least one electric powered component. In a preferred embodiment, excess electric power is used to keep batteries of the motor vehicle charged up. In a preferred embodiment provision is made for hot water to be circulated from the combustion unit to the cab space to provide heat for the cab space when desired.

DETAILED DESCRIPTION OF PREFERRED EMBODIMENTS

Preferred embodiments of the present invention can be described by reference to the drawings.

Figure 1:
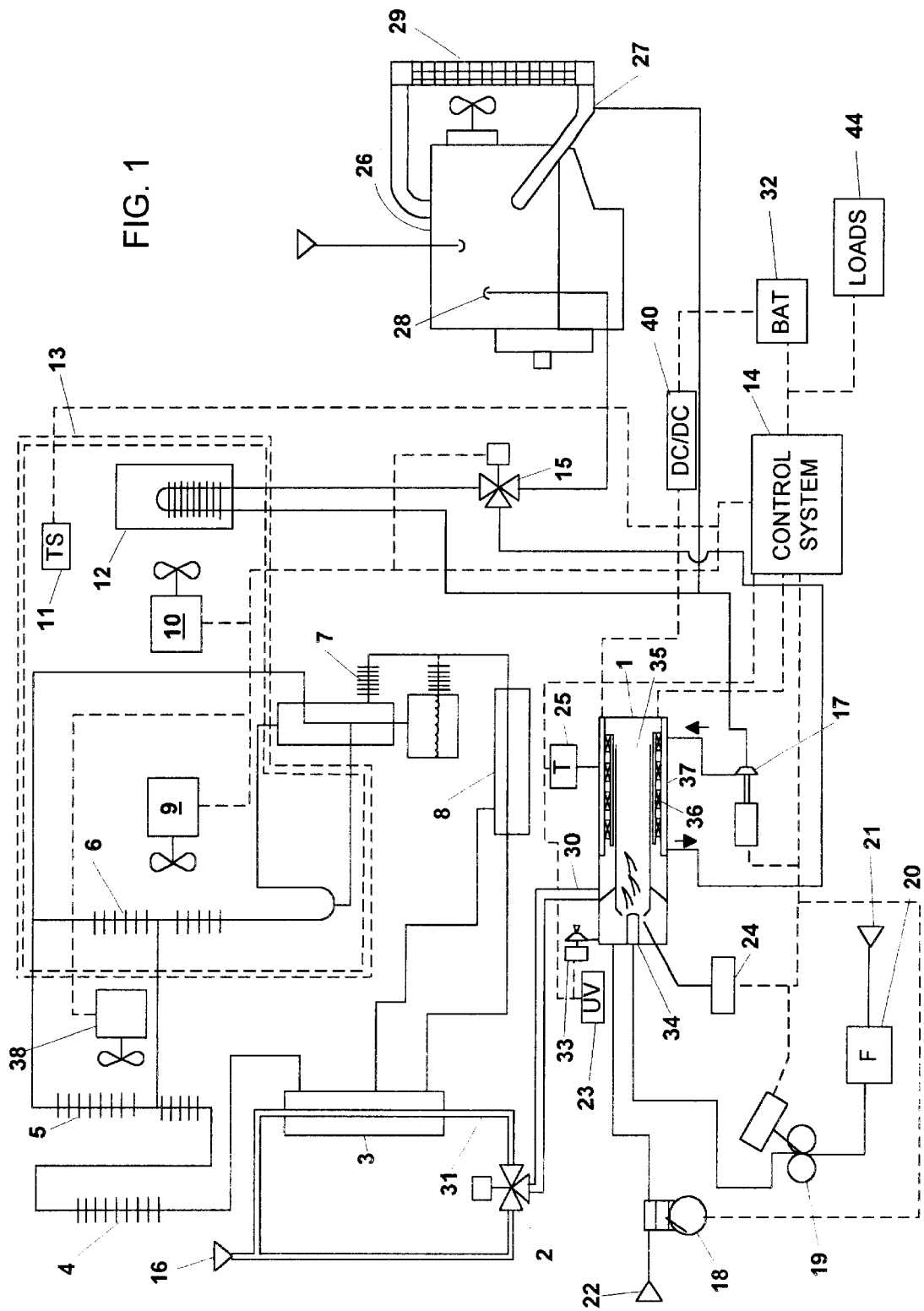
FIG. 1 shows a preferred embodiment of the present invention
Figure 2A:
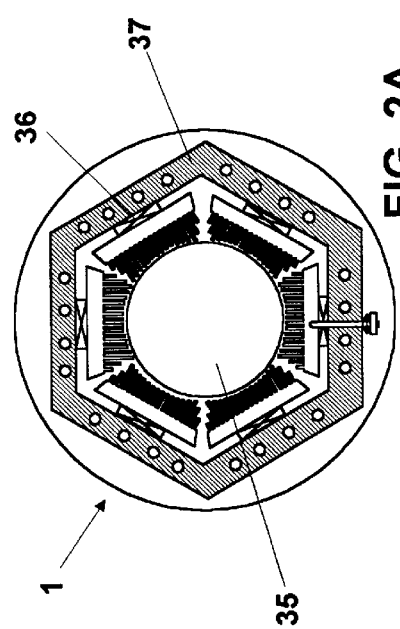
FIGS. 2A and 2B show detailed views of portions of a preferred embodiment of the present invention.
Figure 2B:
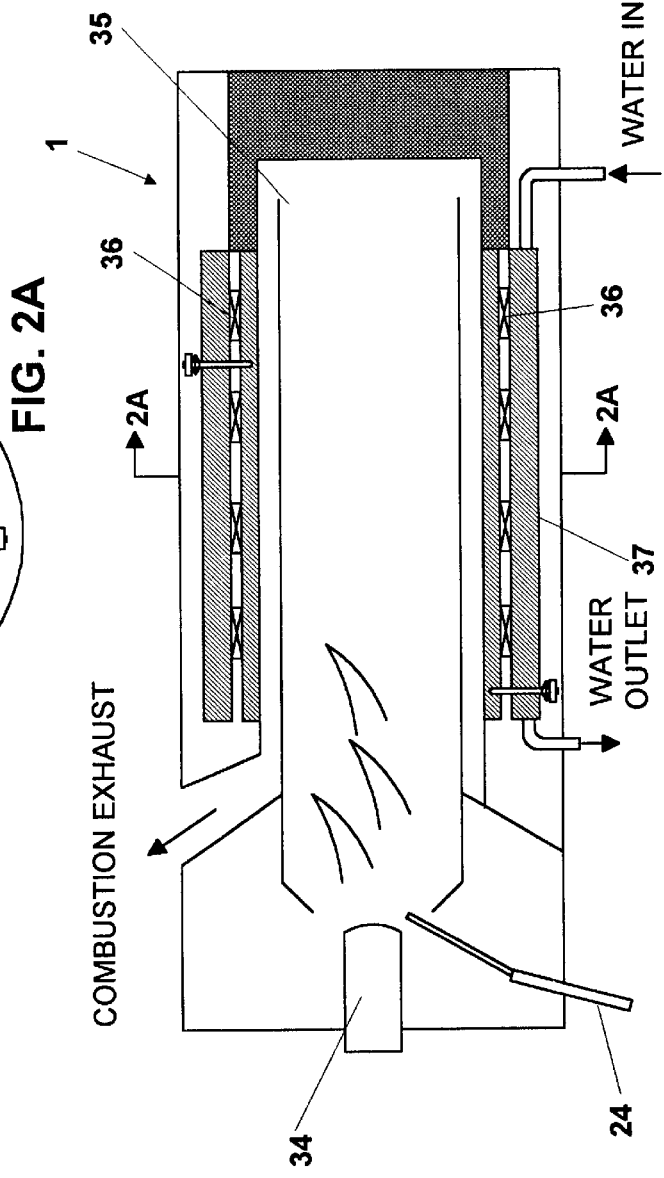

A first preferred embodiment of the present invention and be described by reference to FIGS. 1, 2A, 2B and 3. Diesel fuel from a truck's fuel tank is supplied through line 21 as shown in FIG. 1. Fuel pump 19 draws the fuel through filter 20. The fuel is fed into a fuel atomizer 34 having features similar to the one described in detail in U.S. Pat. No. 5,449,288. The atomized fuel is mixed with air from blower 33, is ignited by ignition coil 24 and burns in combustion chamber as shown in FIG. 1 and as described in the referenced patent. Combustion is confirmed by ultraviolet sensor 23. Twenty-four thermoelectric modules are mounted around the circumference of combustion chamber 35 as shown in FIGS. 2A and 2B. These modules are preferably Model HI-Z 14 that are described in detail in U.S. Pat. No. 5,875,098. With a temperature difference of about 360 F., these modules each produce about 14 Watts at a voltage range of about 1.65 volts. A single series of twenty-four modules 36 are connected in series to produce about 40 volts.

Heat from the combustion process is directed back outside the combustion chamber to transfer heat through thermoelectric modules 36 and into cooling chamber 37 which operates as a cold side heat sink for modules 36. In chamber 37 the heat is transferred to engine cooling water pumped by pump 17.

Figure 4:
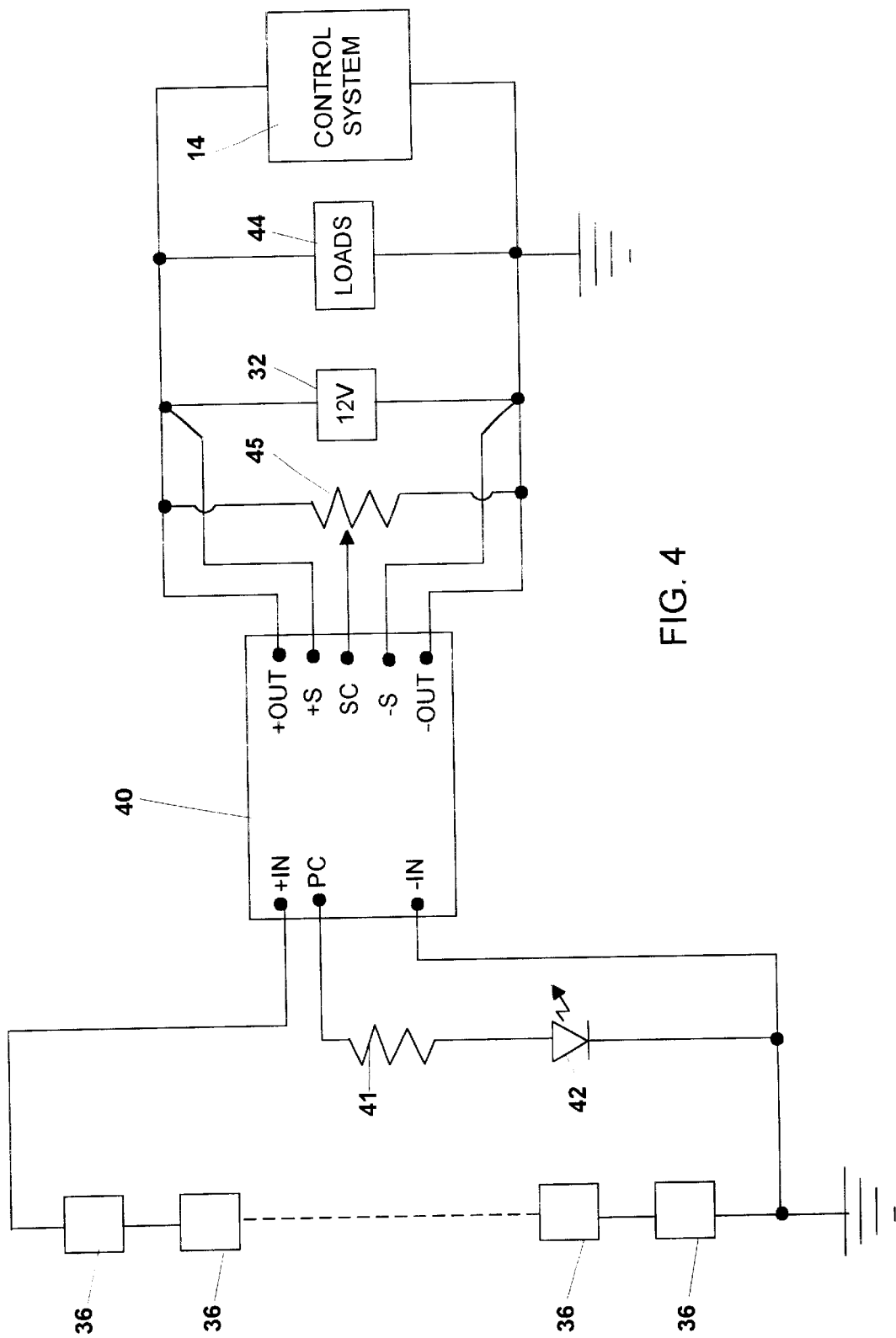
FIG. 4 shows a preferred embodiment of the present invention.

Electricity produced by direct thermal conversion in modules 36 is used to charge truck battery 32 and to provide power to the air conditioning system and self powered heater through control system 14. A preferred embodiment is shown in FIG. 4. Twenty-four modules 36 are connected electrically in series to provide a maximum output of 336 watts at 40 volts DC. Modules 36 are connected to the input of DC/DC converter 40 (model no. V48A 12C 500AL, available from Vicor Corporation, Andover, Mass.) which will change the voltage from 40 volts to a nominal 12 volts DC to charge truck battery 32 with a conversion efficiency of approximately 80%–90% and to provide up to 300 Watts to battery 32 and the truck's electrical system. Resistor 41 limits the current from pin PC on converter 40 and provides the correct current to light emitting diode 42 indicating that power is flowing from modules 36 to converter 40. Diode 42 can be mounted on the dashboard of the truck so that the driver can observe it. The maximum voltage delivered to battery 32 is controlled by the balance in variable resistor 45 to provide a control voltage to sensing pin SC on converter 40.

The temperature within sleeper cab is detected by thermostat 11. The temperature signal is passed to control system 14 where a microprocessor is used to determine whether heating or cooling is required. If heating is required, diverter valve 15 is actuated to divert warm water exiting from cooling chamber 37 to pass through heat exchanger 12 located within the sleeper cab. Air is circulated by fan 10 through heat exchanger 12 and into sleeper cab 13.

The cooling water is then diverted back to circulation pump 17 and to self-powered heater 1. That cooling water not diverted to heat exchanger 12 is circulated back through engine 26 via coolant pump 28 and the engine radiator 29 and then back to self-powered heater 1 through coolant connection 27. When sleeper cab cooling is required, all of the coolant from self powered heater is routed to engine 26 by valve 15.

Exhaust gasses exit heater 1 at temperatures in the range of 300 C. to 350 C. through exhaust pipe 30 and diverter valve 2 which directs the gasses straight out to the atmosphere at point 16 or through generator 3 of the absorption refrigeration system. The amount of exhaust flow directed through generator 3 is regulated by control system 14 based on the setting of thermostat 11 and the temperature in the cab. After giving up its sensible heat to the coolant system fluid in generator 3, the exhaust gas passes to the atmosphere at point 16.

This absorption system is the well-known Platen-Munters type referred to in the background section. This type uses ammonia and hydrogen as a working fluid. A strong solution of ammonia is boiled in generator 3. Ammonia vapor passes from generator 3 up through rectifier 4 where steam is condensed to water (which flows back down to generator 3) and the ammonia vapor proceeds to condenser 5 where heat is removed and the ammonia vapor is condensed. Fan 38 is used to remove heat from condenser 5 and allow the system to respond more quickly to thermal changes.

Gas, vapor and liquid pass to evaporator 6 within the sleeper cab where the liquid ammonia evaporates and absorbs heat energy from the air in the sleeper cab which is being circulated through fins of evaporator 6 by fan 9. Ammonia vapor and hydrogen gas pass down through heat exchanger 39 where the mixture comes into contact with and is absorbed by weak ammonia solution flowing from a mid level of generator 3 to form a strong ammonia which passes through reheat exchanger 8 back to generator 3 to repeat the cycle.

In a second embodiment the number of thermoelectric modules is reduced to six modules of HZ Model 14 which together in series produce about 72 Watts at about 24 Volts.

Figure 3:
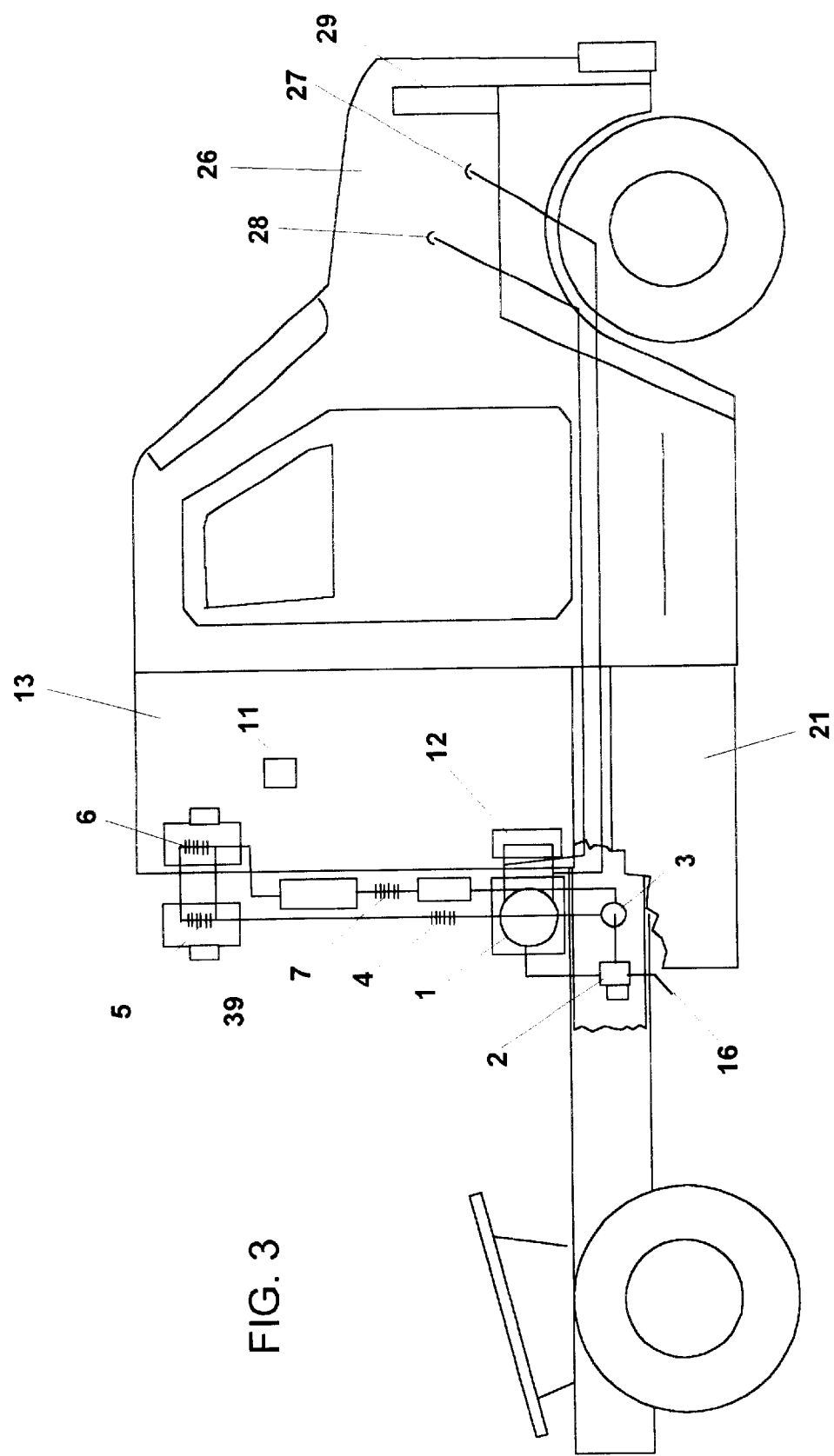
FIG. 3 shows some of the important elements of a preferred embodiment of the present invention.

FIG. 3 is a drawing of the truck cab showing some of the important elements of the present invention.

While the above description has dealt with a single preferred embodiment of the present invention, the reader should understand that many modifications could be made and still be within the scope of the invention. For example the generator 3 could be located adjacent to the combustion unit 1 so as to receive heat directly form the combustion unit and/or the thermoelectric modules could be positioned to receive heat from the heat exhaust. Therefore, the attached claims and their legal equivalents should determine the scope of the invention.

I claim:

1. A motor vehicle with a self powered air conditioner system, comprising:
   A) a motor vehicle having a cab space, a fuel tank, and a cooling water system, and
   B) an absorption type air conditioning unit configured to air condition at least a portion of said cab space, said air conditioning unit comprising:
      1) at least one electric powered component,
      2) a generator located outside said cab space for vaporizing a refrigerant,
      3) a condenser for condensing said refrigerant to produce a condensate,
      4) an evaporator configured to remove heat from said cab space by a process of evaporation of said condensate,
      5) a combustion unit configured to burn fuel from said fuel tank said combustion unit providing heat to a hot surface,
      6) a plurality of thermoelectric modules mounted in thermal contact with said hot surface,
      7) a heat sink cooled by said cooling water system, said heat sink being positioned in thermal contact with said plurality of thermoelectric modules to produce a temperature difference across said modules to permit them to generate electrical power, and
      8) an electric control circuit configured to utilize electric power generated by said modules to power said at least one electric powered component.

2. A motor vehicle with a self powered air conditioner system as in claim 1, further comprising a heater unit wherein heated cooling water is circulated from said combustion unit to said cab space to heat said cab space when heating of the cab space is called for by said control circuit.

3. A motor vehicle with a self powered air conditioner system as in claim 1, wherein said at least one electric powered component comprises a water pump for pumping hot water from said heat sink.

4. A motor vehicle with a self powered air conditioner system as in claim 3 wherein said at least one electric powered component also comprises a fan for circulating cab space air through said evaporator.

5. A motor vehicle with a self powered air conditioner system as in claim 1, wherein said absorption type air conditioning unit is a Platen-Munters type unit.

6. A motor vehicle with a self powered air conditioner system as in claim 1 wherein hot exhaust from said combustion unit is uses to provide heat to said generator.

\* \* \* \* \*